United States Patent [19]

Besenmatter et al.

[11]  4,183,636

[45]  Jan. 15, 1980

[54] PROJECTION SYSTEM

[75] Inventors: Walter Besenmatter, Vienna; Günter Kurz, Vösendorf; Otto Metzler; Trude Muszumanski, both of Vienna, all of Austria

[73] Assignees: Karl Vockenhuber; Raimund Hauser, both of Vienna, Austria

[21] Appl. No.: 903,541

[22] Filed: May 8, 1978

[30] Foreign Application Priority Data

May 9, 1977 [AT] Austria ................................. 3267/77

[51] Int. Cl.² .............................................. G03B 5/02
[52] U.S. Cl. .................................................... 353/101
[58] Field of Search ........................... 353/101, 69, 70; 350/247

[56] References Cited

U.S. PATENT DOCUMENTS

| | | | |
|---|---|---|---|
| 1,996,054 | 4/1935 | Bowen | 353/97 |
| 3,134,295 | 5/1964 | Brown et al. | 353/12 |
| 3,506,329 | 4/1970 | Weaver | 350/247 |

Primary Examiner—Harry N. Haroian
Attorney, Agent, or Firm—Montague & Ross

[57] ABSTRACT

A projector for motion pictures or slides has a varifocal objective with a positive front component, an axially slidable negative intermediate component and a fixed positive rear lens group. The front component, or at least its foremost lens member, has a lens mount which is displaceable along a track substantially transverse to the optical axis; the track may be curved with its convex side facing the projection screen. A diaphragm just behind the front component has an aperture barely exceeding the diameter of the intermediate component whereas the front component (or its transversely displaceable part) is radially extended past the diaphragm aperture so as to register with it in every position.

9 Claims, 10 Drawing Figures

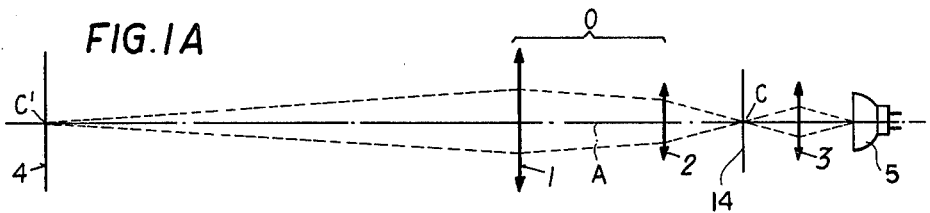
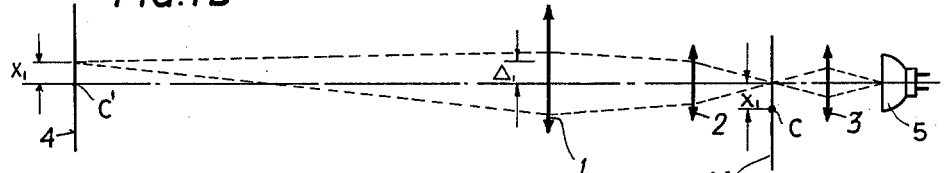
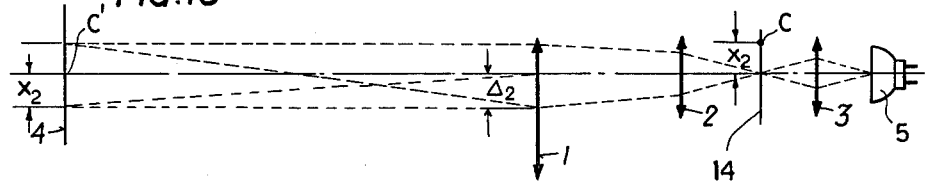
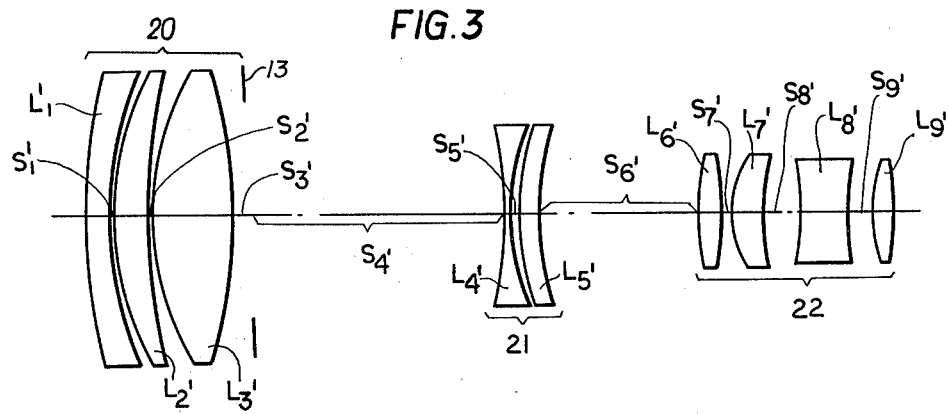
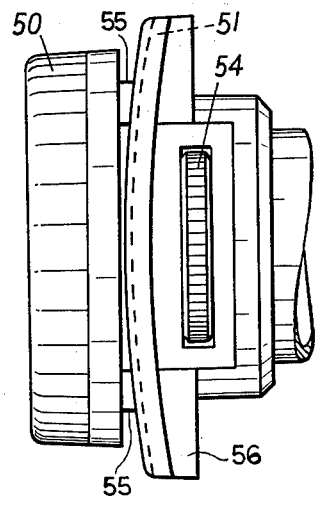
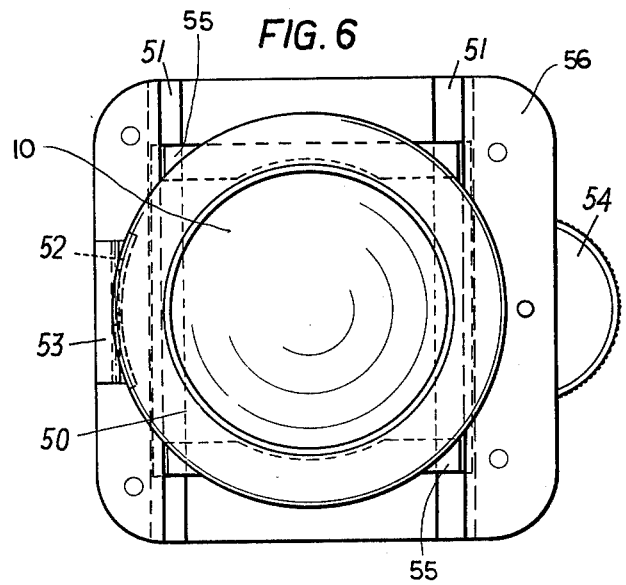

PROJECTION SYSTEM

FIELD OF THE INVENTION

Our present invention relates to an optical system for the projection of images from a carrier, such as a motion-picture film or a slide, upon a receiving surface such as a screen.

BACKGROUND OF THE INVENTION

Because of possible minor shifts between the frames of a film and its perforations, or to compensate for tolerances in the dimensions of a slide holder, it is often desirable to move the light beam of a projector in a direction parallel to the receiving surface. This may be achieved by transversely displacing the entire projection objective, as described in German utility model No. 7,208,770 or British Pat. No. 419,177. Another solution, described in U.S. Pat. No. 3,963,337, involves the use of a swivelable lamp housing containing a corrective lens assembly. A further system, described in German published specification No. 2,411,740, involves the shifting of a slide support with reference to a pair of associated projection objectives.

OBJECT OF THE INVENTION

The object of our present invention is to provide an image-projecting system in which a transverse shifting of the beam, e.g. in a vertical plane, can be carried out by simple means and without the need for displacing an entire projection objective.

SUMMARY OF THE INVENTION

We realize this object, in accordance with our present invention, by the provision of a support for a front member of the objective which is displaceable inside an objective housing in a direction generally transverse to an optical axis defined by a fixedly positioned rear component. The front member may comprise one or more lenses, proximal to the receiving surface, constituting all or part of an axially fixed positive first component of a varifocal objective whose focal length can be changed by an axial shift of an intermediate or second component, usually of negative refractivity, interposed between that first component and the stationary, usually positive rear component.

The transverse displacement of the front member, with the aid of manual or automatic adjustment means, is limited by the size of that front member which must be so dimensioned that a portion of it always remains in the path of a light beam emanating from the rear component. Advantageously, pursuant to another feature of our invention, the beam diameter is limited by the aperture of a stationary diaphragm which is centered on the optical axis and is positioned immediately behind the front member, the latter extending radially beyond the diaphragm aperture to an extent at least equal to its displacement stroke so as to cover that aperture in every position. If the objective includes an intermediate component approaching the front member in a position of minimum focal length, we prefer to make the diameter of that intermediate component substantially equal to that of the diaphragm aperture.

BRIEF DESCRIPTION OF THE DRAWING

The above and other features of our invention will now be described in detail with reference to the accompanying drawing in which:

FIGS. 1A, 1B and 1C are diagrammatic views of an objective to be used in a projection system embodying our invention;

FIG. 3 is a view similar to FIG. 2B, illustrating a modified projection objective;

FIG. 5 is a side-elevational view of the front portion of a modified objective housing; and FIG. 6 is a face view of the assembly shown in FIG. 5.

SPECIFIC DESCRIPTION

Figure 2A:
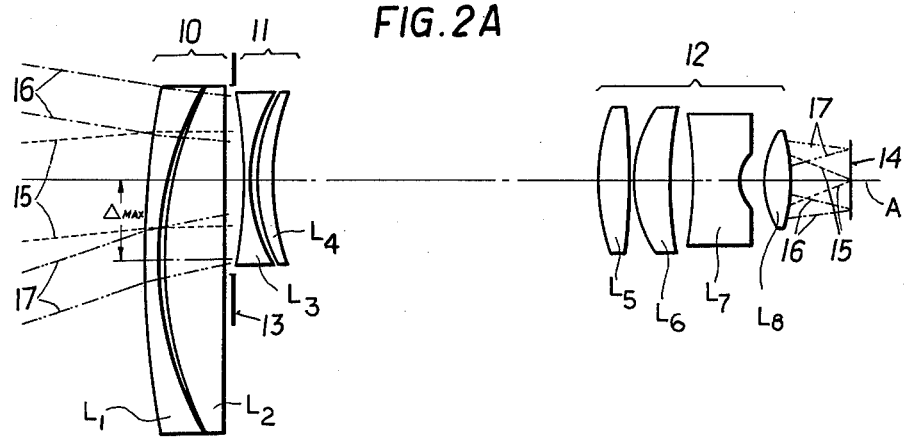
FIGS. 2A, 2B and 2C are more detailed views of a varifocal projection objective in different operating positions.

In FIGS. 1A–1C we have shown a projection objective O schematically represented by a transversely shiftable front component 1, of positive refractivity, and a stationary positive rear component 2 defining an optical axis A. A lamp 5 disposed behind a condenser lens 3 transluminates a transparency 14, e.g. a slide, whose center C coincides in FIG. 1A with the axis A. An image C' of center C, projected by the objective O on a receiving surface 4 such as a screen, also lies on this axis.

FIG. 1B illustrates the case in which the transparency center C is offset from the axis A by a distance $X_1$. In order to maintain the projected image C' of this center on the screen 4 in line with axis A, an opposite shift of the impinging beam by a distance $X_1$ is required. For this purpose it is necessary to displace the front component 1 by a distance $\Delta_1$ determined by the magnification ratio of that component.

FIG. 1C shows a similar offset $x_2$, in the opposite direction, compensated by a shift $\Delta_2$ of component 1 which results in a corrective displacement of the beam at screen 4 by a distance $X_2$.

The relationship between the lens shift $\Delta$ and the excursion X of the projected picture is given by the formula $$X = \Delta(1-\beta)$$

where $\beta$ is the magnification of lens member 1. In some instances, therefore, the lens member and the picture will shift in opposite directions.

Figure 2B:
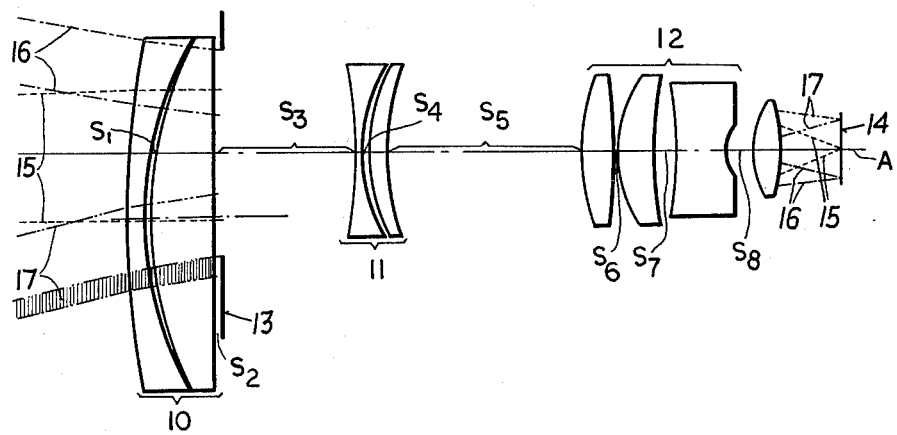
Figure 2C:
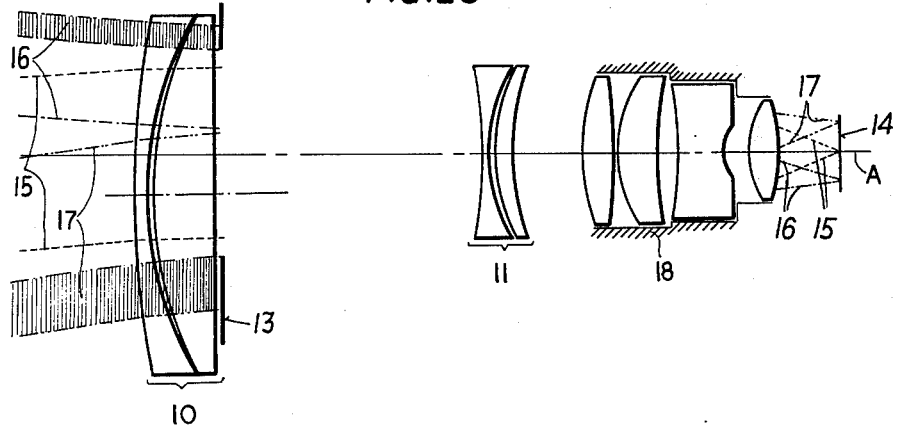

In FIGS. 2A–2C we have illustrated a more elaborate projection objective, of the varifocal type, comprising a positive front component 10, an axially slidable negative intermediate component 11 and a stationary positive rear component 12 proximal to the image carrier 14. A diaphragm 13, centered on axis A, is fixedly interposed between components 10 and 11. It will be noted that the aperture of this diaphragm is only slightly greater than the diameter of intermediate component 11. In FIG. 2A, component 11 lies in a forward position to establish a minimum overall focal length $f_{min}$. FIG. 2B illustrates a middle position, corresponding to an overall focal length $f_{med}$, whereas FIG. 2C represents the opposite end of the varifocal range in which component 11 lies close to component 12 to establish the maximum overall focal length $f_{max}$.

Front component 10 consists of a lens $L_1$ in the form of a negative meniscus separated by a small air space $s_1$ from a substantially planoconvex lens $L_2$. Another small air space $s_2$ separates lens $L_2$ from diaphragm 13 which in turn is separated by a variable air space $s_3$ from a biconcave lens $L_3$ forming part of component 11. The latter also comprises a lens $L_4$, in the form of a positive meniscus, which is separated by a small air space $s_4$ from lens $L_3$ and by a variable air space $s_5$ from the rear component 12. This rear component, supported by a fixed lens mount 18 as shown in FIG. 2C, consists of a biconvex lens $L_5$, a positive meniscus $L_6$, a biconcave lens $L_7$ and a biconvex lens $L_8$ separated by air spaces $s_6$, $s_7$ and $s_8$.

FIGS. 2A–2C show three ray bundles 15, 16 and 17 emanating from a central point and two outlying points of transparency 14. In the position of FIG. 2A, all three ray bundles pass freely from component 11 through the aperture of diaphragm 13 into a portion of front component 10 which in all three views has been shown shifted into a limiting position of its transverse stroke. In FIG. 2B the bundles 15 and 16 still clear the diaphragm aperture whereas bundle 17 is partly intercepted. In the position of FIG. 2C, finally, some of the rays of both outlying bundles 16 and 17 are stopped by the diaphragm 13. Thus, the diaphragm cuts off the most widely divergent rays for which the lenses of component 10 may not be properly corrected and which could therefore give rise to objectionable coma. As illustrated, the diameter of lenses $L_1$ and $L_2$ (or at least their dimension in the place of transverse displacement) is about twice the diameter of the diaphragm aperture, allowing for a maximum shift $\Delta_{max}$ of roughly half the aperture diameter in either direction of axis A.

Representative numerical values for the radii $r_1$–$r_{16}$ and the thicknesses $d_1$–$d_8$ of lenses $L_1$–$L_8$ as well as for the air spaces $s_1$–$s_8$ are given in the following Table I, these numerical values being based on a minimum focal length $f_{min}$ of one linear unit. The Table also gives the refractive indices $n_d$ and the Abbé numbers $\nu_d$ for these lenses.

TABLE I

| | radii | | thicknesses and separations | $n_d$ | $\nu_d$ |
|---|---|---|---|---|---|
| $L_1$ | $r_1 = +5.114$ | $d_1=$ | 0.100 | 1.805 | 25.4 |
| | $r_2 = +2.687$ | | | | |
| | | $s_1=$ | 0.020 | | |
| $L_2$ | $r_3 = +2.700$ | $d_2=$ | 0.399 | 1.691 | 54.7 |
| | $r_4 = -68.780$ | | | | |
| | | $s_2=$ | 0.086 | | |
| | diaphragm | | | | |
| | | $s_3=$ | 0.080 $f_{min}$ / 1.021 $f_{med}$ / 1.962 $f_{max}$ | | |
| $L_3$ | $r_5 = -5.020$ | $d_3=$ | 0.066 | 1.522 | 59.5 |
| | $r_6 = +1.237$ | | | | |
| | | $s_4=$ | 0.020 | | |
| $L_4$ | $r_7 = +1.249$ | $d_4=$ | 0.140 | 1.722 | 29.3 |
| | $r_8 = +1.801$ | | | | |
| | | $s_5=$ | 2.425 $f_{min}$ / 1.484 $f_{med}$ / 0.543 $f_{max}$ | | |
| $L_5$ | $r_9 = +1.434$ | $d_5=$ | 0.239 | 1.603 | 60.6 |
| | $r_{10} = -5.991$ | | | | |
| | | $s_6=$ | 0.007 | | |
| $L_6$ | $r_{11} = +0.788$ | $d_6=$ | 0.322 | 1.641 | 60.1 |
| | $r_{12} = +3.784$ | | | | |
| | | $s_7=$ | 0.126 | | |
| $L_7$ | $r_{13} = -4.646$ | $d_7=$ | 0.386 | 1.805 | 25.4 |
| | $r_{14} = +0.422$ | | | | |
| | | $s_8=$ | 0.193 | | |
| $L_8$ | $r_{15} = +0.714$ | $d_8=$ | 0.199 | 1.784 | 43.9 |
| | $r_{16} = -1.768$ | | | | |

$f_{min} = 1.000$
$f_{med} = 1.357$
$f_{max} = 1.869$
film format $= 0.352 \times 0.263$ In FIG. 3 we have shown a modified projection objective which can be utilized in the same manner as that of FIGS. 2A–2C, having a front component 20, an intermediate component 21 (shown in its middle position corresponding to overall focal length $f_{med}$) and a rear component 22. Component 20 consists of three lenses separated by air spaces $s_1'$ and $s_2'$, i.e. a lens $L_1'$ in the shape of a negative meniscus, a lens $L_2'$ in the shape of a positive meniscus and a biconvex lens $L_3'$. Diaphragm 13 is separated from lens $L_3'$ by a small air space $s_3'$ and from component 21 by a variable air space $s_4'$, that component consisting of two lenses $L_4'$ and $L_5'$ which are separated by a small air space $s_5'$ and are respectively similar to lenses $L_3$ and $L_4$ of component 11 in the preceding embodiment. Another variable air space $s_6'$ intervenes between components 21 and 22, component 22 consisting of four lenses $L_6'$, $L_7'$, $L_8'$, $L_9'$ which are separated by air spaces $s_7'$, $s_8'$, $s_9'$ and are respectively similar to lenses $L_5$–$L_8$ of component 12 in FIGS. 2A–2C.

Representative numerical values for the radii $r_1'$–$r_{18}'$ and the thicknesses $d_1'$–$d_9'$ of lenses $L_1'$–$L_9'$ as well as for the air spaces $s_1'$–$s_9'$ are given in the following Table II, these numerical values being again based on a minimum focal length $f_{min}$ of one linear unit. The Table also gives the refractive indices $n_d$ and the Abbé numbers $\nu_d$ for lenses $L_1'$–$L_9'$.

TABLE II

| | radii | | thicknesses and separations | $n_d$ | $\nu_d$ |
|---|---|---|---|---|---|
| $L_1'$ | $r_1' = +6.887$ | $d_1'=$ | 0.098 | 1.847 | 23.8 |
| | $r_2' = +3.169$ | | | | |
| | | $s_1'=$ | 0.020 | | |
| $L_2'$ | $r_3' = +3.017$ | $d_2'=$ | 0.295 | 1.492 | 54.7 |
| | $r_4' = +25.736$ | | | | |
| | | $s_2'=$ | 0.007 | | |
| $L_3'$ | $r_5' = +3.816$ | $d_3'=$ | 0.295 | 1.492 | 54.7 |
| | $r_6' = -98.389$ | | | | |
| | | $s_3'=$ | 0.000 | | |
| | diaphragm | | | | |
| | | $s_4'=$ | 0.079 $f_{min}$ / 1.007 $f_{med}$ / 1.936 $f_{max}$ | | |
| $L_4'$ | $r_7' = -4.952$ | $d_4'=$ | 0.066 | 1.522 | 59.5 |
| | $r_8' = +1.220$ | | | | |
| | | $s_5'=$ | 0.020 | | |
| $L_5'$ | $r_9' = +1.232$ | $d_5'=$ | 0.138 | 1.722 | 29.3 |
| | $r_{10}' = +1.776$ | | | | |
| | | $s_6'=$ | 2.392 $f_{min}$ / 1.464 $f_{med}$ / 0.535 $f_{max}$ | | |

TABLE II-continued

| radii | | thicknesses and separations | $n_d$ | $v_d$ |
|---|---|---|---|---|
| $L_6'$ | $r_{11}' = +1.415$ $r_{12}' = -5.910$ | $d_6' =$ 0.236 | 1.603 | 60.6 |
| | | $s_7' =$ 0.007 | | |
| $L_7'$ | $r_{13}' = +0.777$ $r_{14}' = +3.733$ | $d_7' =$ 0.318 | 1.641 | 60.1 |
| | | $s_8' =$ 0.125 | | |
| $L_8'$ | $r_{15}' = -4.584$ $r_{16}' = +0.416$ | $d_8' =$ 0.380 | 1.805 | 25.4 |
| | | $s_9' =$ 0.190 | | |
| $L_9'$ | $r_{17}' = +0.705$ $r_{13}' = -1.745$ | $d_9' =$ 0.197 | 1.784 | 43.9 |
| | $f_{min} = 1.000$ | | | |
| | $f_{med} = 1.365$ | | | |
| | $f_{max} = 1.892$ | | | |
| | film format $= 0.352 \times 0.263$ | | | |

Figure 4:
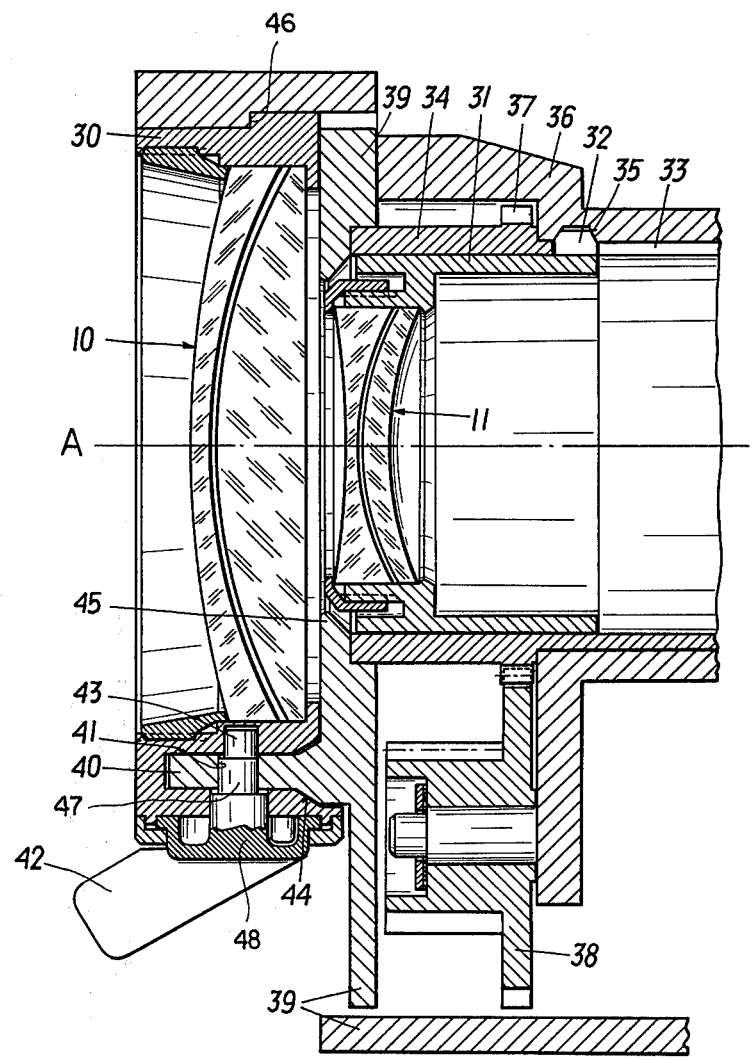
FIG. 4 is an axial sectional top view of a front portion of an objective housing with certain components of the objective of FIGS. 2A–2C shown supported therein.

In FIG. 4 we have shown components 10 and 11 of the objective of FIGS. 2A–2C emplaced in a housing 39 forming tracks in the shape of a rail 40 and a shoulder 46 for the guidance of a lens mount 30 supporting the component 10. Component 11 is held in a lens mount 31 which is axially slidable under the control of a sleeve 34 rotatable about axis A, this sleeve having an axially extending slot 33 penetrated by a cam-follower pin 32 on lens mount 31. A lens barrel 36 rigid with housing 39 surrounds the sleeve 34 and has a cam groove 35 engaged by the pin 32. Rotation of sleeve 34 may be carried out with the aid of a nonillustrated motor drivingly connected with a pinion 38 which meshes with gear teeth 37 on the outer sleeve surface.

Rail 40 has a slot 41 penetrated by a stem 43 of a rotary knob 48 carried on lens mount 30, this stem having an eccentric middle section 47 received in slot 41. A handle 42, rigid with knob 48, can be used to slide the lens mount 30 along its tracks 40 and 46 into a desired position; a rotation of the knob 48 by the handle 42, in a sense bringing the eccentric 47 into its illustrated left-hand position, clamps the lens mount against a beveled flank 44 of rail 40 to lock the component 10 in place. The tracks 40 and 46, extending generally transversely to the plane of the paper in FIG. 4, need not be rectilinear but could be curved with a convex side facing toward the left, i.e. in the direction of screen 4 shown in FIGS. 1A–1C. Such a curved track has been illustrated in FIGS. 5 and 6 in the form of two grooves 51 in an objective housing 56, these grooves being engaged by preferably dovetail-shaped skids 55 of a lens mount 50 holding the front component 10. The transverse shifting of this lens mount can be carried out with the aid of an actuating member 53, such as a rack or a worm, engaging a toothed peripheral segment of the nonrotatable lens mount 50. A milled setting wheel 54 projecting from housing 56 serves in this case to rotate a control sleeve, such as the one shown at 34 in FIG. 4, for varying the focal length of the objective.

Tracks 51 may have a circular curvature centered on a rearwardly positioned transverse axis. The slight tilting of front component 10 on its excursions from the optical axis serves to maintain the plane of maximum contrast of the objective substantially coincident with the receiving surface 4.

The transverse displacement of a front member in accordance with our invention, as described above, avoids objectionable distortions such as the so-called keystone effect discussed in the aforementioned U.S. Pat. No. 3,963,337, i.e. the divergence of supposedly parallel edges of the projected picture.

We claim:

1. An optical system for directing converging light rays from points of an image carrier onto a receiving surface, comprising:
   an objective housing;
   a projection objective in said housing including a front lens member proximal to said receiving surface and a rear component proximal to said carrier, said rear component being centered on an axis perpendicular to said image carrier;
   a support for said front lens member displaceable in a predetermined axial plane in a direction generally parallel to said image carrier;
   stationary mounting means for said rear component in said housing; and
   adjustment means for transversely displacing said support within said plane, between limits maintaining a portion of said front lens member in the path of a light beam emanating from said rear component, to shift the converging light rays in said axial plane.

2. An optical system as defined in claim 1 wherein said support is displaceable in two opposite directions from a normal position in which said front lens member is centered on said axis.

3. An optical system as defined in claim 1, further comprising a stationary diaphragm in said housing centered on said axis immediately rearwardly of said front lens member, said diaphragm having a beam-limiting aperture, said front lens member extending radially within said plane beyond said aperture to an extent at least equal to its stroke of transverse displacement.

4. An optical system as defined in claim 3 wherein said objective further includes an intermediate component rearwardly of said shiftable along said axis for varying the focal length of the objective, said intermediate component having a diameter substantially equal to that of said aperture.

5. An optical system as defined in claim 1, 2, 3 or 4 wherein said housing forms a track for said support, said adjustment means being operable to displace said support along said track.

6. An optical system as defined in claim 5 wherein said track is curved with a forward convexity.

7. An optical system for projecting images from a carrier upon a receiving surface comprising:
   an objective housing;
   a projection objective in said housing including a front lens member proximal to said receiving surface, a rear component proximal to said carrier, said rear component being centered on an axis perpendicular to said receiving surface, and an intermediate component shiftable along said axis for varying the focal length of the objective;
   a support for said front lens member displaceable in a direction generally transverse to said axis;
   stationary mounting means for said rear component in said housing;
   adjustment means for transversely displacing said support within limits maintaining a portion of said front lens member in the path of a light beam emanating from said rear component; and
   a stationary diaphragm in said housing centered on said axis immediately rearwardly of said front lens member, said diaphragm having a beam-limiting aperture, said front lens member extending radially beyond said aperture to an extent at least equal to its stroke of transverse displacement, said intermediate component having a diameter substantially equal to that of said aperture;

said front lens member comprising two lenses $L_1$ and $L_2$, said intermediate component comprising two lenses $L_3$ and $L_4$, and said rear component comprising four lenses $L_5$, $L_6$, $L_7$ and $L_8$, said lenses having radii of curvature $r_1$ to $r_{16}$, thicknesses $d_1$ to $d_8$ and separations $s_1$ to $s_8$ whose numerical values, based on a minimum focal length of unity, along with their refractive indices $n_d$ and Abbé numbers $v_d$ are substantially as given in the following table:

| | radii | | thicknesses and separations | $n_d$ | $v_d$ |
|---|---|---|---|---|---|
| $L_1$ | $r_1 = +5.1$ $r_2 = +2.7$ | $d_1 =$ | 0.10 | 1.81 | 25 |
| | | $s_1 =$ | 0.02 | | |
| $L_2$ | $r_3 = +2.7$ $r_4 = -68.8$ | $d_2 =$ | 0.40 | 1.69 | 55 |
| | | $s_2 =$ | 0.09 | | |
| | diaphragm | | | | |
| | | $s_3 =$ | 0.08 $f_{min}$ / 1.02 $f_{med}$ / 1.92 $f_{max}$ | | |
| $L_3$ | $r_5 = -5.0$ $r_6 = +1.2$ | $d_3 =$ | 0.07 | 1.52 | 60 |
| | | $s_4 =$ | 0.02 | | |
| $L_4$ | $r_7 = +1.2$ $r_8 = +1.8$ | $d_4 =$ | 0.14 | 1.72 | 29 |
| | | $s_5 =$ | 2.43 $f_{min}$ / 1.48 $f_{med}$ / 0.54 $f_{max}$ | | |
| $L_5$ | $r_9 = +1.4$ $r_{10} = -6.0$ | $d_5 =$ | 0.24 | 1.60 | 61 |
| | | $s_6 =$ | 0.01 | | |
| $L_6$ | $r_{11} = +0.8$ $r_{12} = +3.8$ | $d_6 =$ | 0.32 | 1.64 | 60 |
| | | $s_7 =$ | 0.13 | | |
| $L_7$ | $r_{13} = +4.6$ $r_{14} = +0.4$ | $d_7 =$ | 0.39 | 1.81 | 25 |
| | | $s_8 =$ | 0.19 | | |
| $L_8$ | $r_{15} = +0.7$ $r_{16} = -1.8$ | $d_8 =$ | 0.20 | 1.78 | 44 |

8. An optical system for projecting images from a carrier upon a receiving surface, comprising:
an objective housing;
a projection objective in said housing including a front lens member proximal to said receiving surface, a rear component proximal to said carrier, said rear component being centered on an axis perpendicular to said receiving surface, and an intermediate component shiftable along said axis for varying the focal length of the objective;
a support for said front lens member displaceable in a direction generally transverse to said axis;
stationary mounting means for said rear component in said housing;
adjustment means for transversely displacing said support within limits maintaining a portion of said front lens member in the path of a light beam emanating from said rear component; and
a stationary diaphragm in said housing centered on said axis immediately rearwardly of said front lens member, said diaphragm having a beam-limiting aperture, said front lens member extending radially beyond said aperture to an extent at least equal to its stroke of transverse displacement, said intermediate component having a diameter substantially equal to that of said aperture;

said front lens member comprising three lenses $L_1'$, $L_2'$ and $L_3'$, said intermediate component comprising two lenses $L_4'$ and $L_5'$ and said rear component comprising four lenses $L_6'$, $L_7'$, $L_8'$ and $L_9'$, said lenses having radii of curvature $r_1'$ to $r_{18}'$, thicknesses $d_1'$ to $d_9'$ and separations $s_1'$ to $s_9'$ whose numerical values, based on a minimum focal length of unity, along with their refractive indices $n_d$ and Abbé numbers $v_d$ are substantially as given in the following table:

| | radii | | thicknesses and separations | $n_d$ | $v_d$ |
|---|---|---|---|---|---|
| $L_1'$ | $r_1' = +6.9$ $r_2' = +3.2$ | $d_1' =$ | 0.10 | 1.85 | 24 |
| $L_2'$ | $r_3' = +3.0$ $r_4' = +25.7$ | $s_1' =$ $d_2' =$ | 0.20 0.30 | 1.49 | 55 |
| | | $s_2' =$ | 0.01 | | |
| $L_3'$ | $r_5' = +3.8$ $r_6' = -98.4$ | $d_3' =$ | 0.30 | 1.49 | 55 |
| | | $s_3' =$ | 0.00 | | |
| | diaphragm | | | | |
| | | $s_4' =$ | 0.08 $f_{min}$ / 1.01 $f_{med}$ / 1.94 $f_{max}$ | | |
| $L_4'$ | $r_7' = -5.0$ $r_8' = +1.2$ | $d_4' =$ | 0.07 | 1.52 | 60 |
| | | $s_5' =$ | 0.02 | | |
| $L_5'$ | $r_9' = +1.2$ $r_{10}' = +1.8$ | $d_5' =$ | 0.14 | 1.72 | 29 |
| | | $s_6' =$ | 2.39 $f_{min}$ / 1.46 $f_{med}$ / 0.54 $f_{max}$ | | |
| $L_6'$ | $r_{11}' = +1.4$ $r_{12}' = -5.9$ | $d_6' =$ | 0.24 | 1.60 | 61 |
| | | $s_7' =$ | 0.01 | | |
| $L_7'$ | $r_{13}' = +0.8$ $r_{14}' = +3.7$ | $d_7' =$ | 0.32 | 1.64 | 60 |
| | | $s_8' =$ | 0.13 | | |
| $L_8'$ | $r_{15}' = -4.6$ $r_{16}' = +0.4$ | $d_8' =$ | 0.38 | 1.81 | 25 |
| | | $s_9' =$ | 0.19 | | |
| $L_9'$ | $r_{17}' = +0.7$ $r_{18}' = -1.7$ | $d_9' =$ | 0.20 | 1.78 | 44 |

9. An optical system for projecting images from a carrier upon a receiving surface, comprising:
an objective housing forming a curved track convex toward said receiving surface;
a projection objective in said housing, said objective including a front lens member proximal to said receiving surface and a rear component proximal to said carrier, said rear component being centered on an axis perpendicular to said receiving surface;
a support for said front lens member displaceable on said track in a direction generally transverse to said axis;
stationary mounting means for said rear component in said housing; and
adjustment means for transversely displacing said support along said track within limits maintaining a portion of said front lens member in the path of a light beam emanating from said rear component.

* * * * *